United States Patent
Stevens

(10) Patent No.: US 7,426,320 B2
(45) Date of Patent: Sep. 16, 2008

(54) PERFORMANCE CONTROLLING PARAMETER SETTING IN AN IMAGE PROCESSING SYSTEM

(75) Inventor: Ashley Miles Stevens, Cambridge (GB)

(73) Assignee: ARM Limited, Cambridge (GB)

( * ) Notice: Subject to any disclaimer, the term of this patent is extended or adjusted under 35 U.S.C. 154(b) by 621 days.

(21) Appl. No.: 10/840,233

(22) Filed: May 7, 2004

(65) Prior Publication Data

US 2005/0057571 A1   Mar. 17, 2005

(30) Foreign Application Priority Data

Sep. 17, 2003   (GB) ................................ 0321788.2

(51) Int. Cl.
*G06T 1/00*   (2006.01)
(52) U.S. Cl. ...................................... 382/307
(58) Field of Classification Search ................. None
See application file for complete search history.

(56) References Cited

U.S. PATENT DOCUMENTS

| | | | |
|---|---|---|---|
| 5,420,787 A * | 5/1995 | Gawne et al. ............... | 382/207 |
| 5,627,412 A | 5/1997 | Beard | |
| 6,072,543 A * | 6/2000 | Kim ........................... | 725/151 |
| 6,252,612 B1 * | 6/2001 | Jeddeloh .................... | 345/531 |
| 2002/0188877 A1 | 12/2002 | Buch | |
| 2003/0031128 A1 * | 2/2003 | Kim et al. .................. | 370/229 |
| 2003/0179208 A1 * | 9/2003 | Lavelle ....................... | 345/539 |

FOREIGN PATENT DOCUMENTS

| EP | 1 139 205 A1 | 10/2001 |
|---|---|---|
| GB | 2 335 293 A | 9/1999 |
| GB | 2 345 774 A | 7/2000 |

* cited by examiner

*Primary Examiner*—Brian P. Werner
*Assistant Examiner*—Eueng-nan Yeh
(74) *Attorney, Agent, or Firm*—Nixon & Vanderhye P.C.

(57) ABSTRACT

A data processing system is provided for setting a value of a performance controlling parameter during processing of a data stream comprising a plurality of data blocks. The performance controlling parameter is set by deriving a complexity measure for at least one data block by performing an initial processing stage on the at least one data block. The performance controlling parameter is set to a predicted value in dependence upon the complexity measure and at least one further processing stage is performed on the at least one data block at the predicted value of the performance controlling parameter.

45 Claims, 4 Drawing Sheets

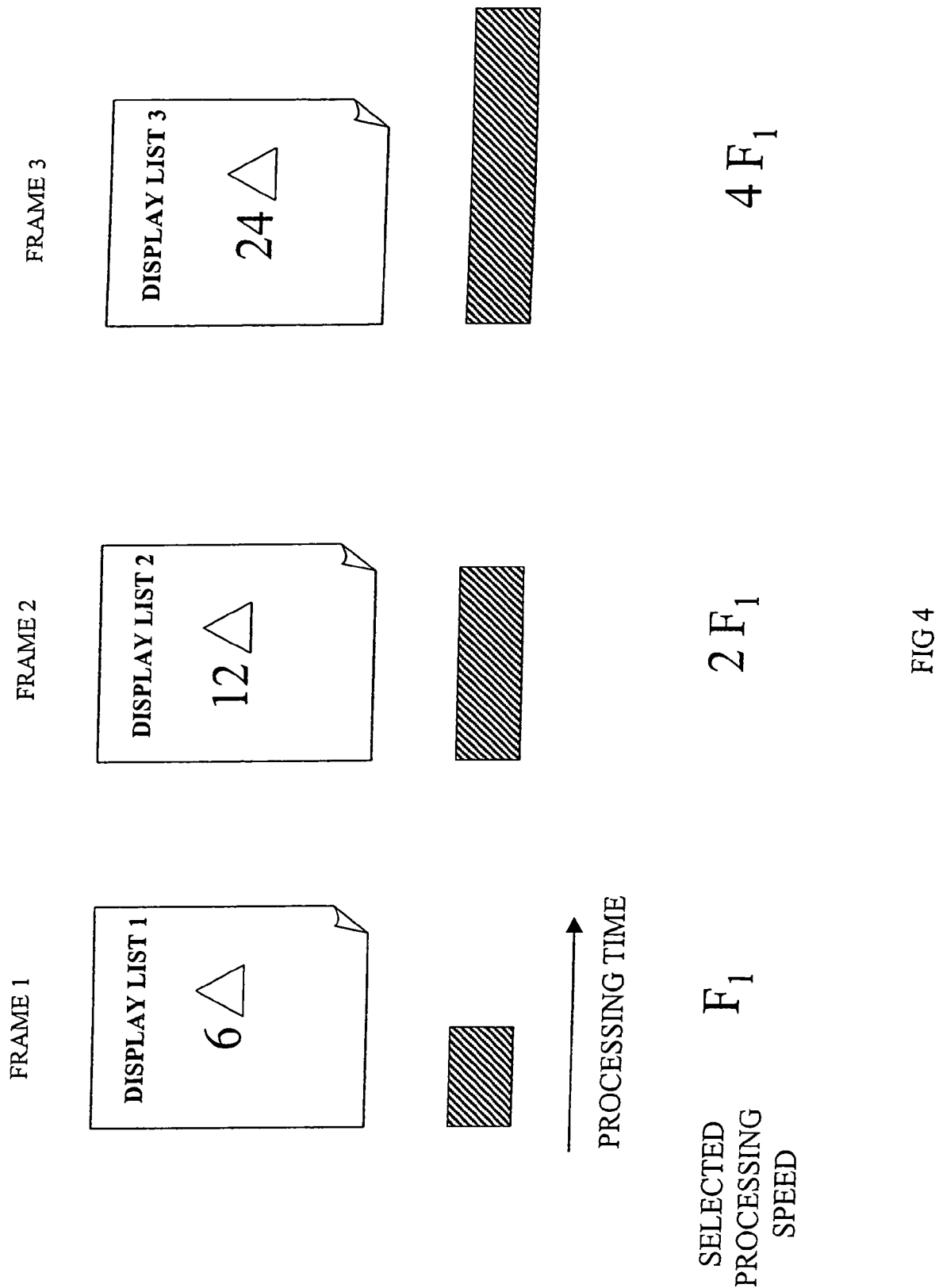

PERFORMANCE CONTROLLING PARAMETER SETTING IN AN IMAGE PROCESSING SYSTEM

BACKGROUND OF THE INVENTION

1. Field of the Invention

This invention relates to the field of data processing systems. More particularly, this invention relates to the setting of performance controlling parameter values in data processing systems.

2. Description of the Prior Art

Some modern data processors offer the functionality of allowing the processor to be set to one of a number of different performance levels at a given time, depending on the requirements of the program application(s). Such processors take advantage of the fact that reducing the clock frequency and the corresponding operating voltage of the processor can potentially yield a quadratic decrease in energy consumption. However, processor performance reduction is only acceptable if it does not adversely impact performance as perceived by the user. In image processing systems, such as 3D graphics processing systems, the graphics processor will typically be run at full speed and as a consequence the frame rate will vary in accordance with the complexity of the image frame being processed. To take advantage of different processor performance levels it is necessary to be able to predict the lowest clock level that enables a desired frame rate to be maintained.

It is known to predict the amount of data processing required to perform a data processing operation on a current data block of an input data stream using information on the amount of data processing actually performed on one or more previously processed data blocks. It is desirable that the prediction function should be "damped" to avoid sudden changes in the amount of data processing work for a given block unduly influencing the predicted performance level for future data blocks. For this reason the prediction is likely to be based on a weighted average of the data processing work performed on the preceding four or five image fields/frames. A problem with such known prediction systems is that when there is a sudden change in the complexity at a frame boundary in an image sequence, for example, when a scene change occurs, the predicted processor level may significantly deviate from the level actually required to perform the processing work required to render that image within the required timescale. Accordingly, there is a need for a system for controlling a performance parameter such as a processor operating frequency that is more responsive to sudden changes in the processing work required to perform a processing operation on successive data blocks.

SUMMARY OF THE INVENTION

According to a first aspect the invention provides a method of setting a value of a performance controlling parameter of a data processing apparatus operable to perform a processing operation upon at least one data block of an input data stream comprising a plurality of data blocks, said method comprising:

performing an initial processing stage of said processing operation on said at least one data block;

deriving from at least one result of said initial processing stage a complexity measure indicative of an amount of data processing required to perform at least one further processing stage of said processing operation upon said at least one data block;

setting said performance controlling parameter to a predicted value in dependence upon said complexity measure; and performing said at least one further processing stage upon said at least one data block subject to said predicted value of said performance controlling parameter.

The present invention provides a system whereby a performance controlling parameter can be set for a data block by performing an initial processing operation on the data block to derive a complexity measure that may be used to estimate the data processing work required to complete further data processing operations on that data block so that the performance controlling parameter can be set in accordance with the complexity measure. This has the advantage that characteristic properties of the data block itself rather than properties of only preceding data blocks in the input data stream are used to predict the performance controlling parameter. Accordingly, the present invention is less reliant on temporal correlations between adjacent data blocks to make an accurate prediction for the parameter. The technique is particularly advantageous where there is a distinct change in properties between successive data blocks, such as at scene change boundaries in a sequence of image frames since it allows for more accurate predictions based on properties of the actual data block to which the performance controlling parameter is to be applied yet does not unduly impact the performance prediction for processing of subsequent data blocks.

It will be appreciated that the performance controlling parameter could be one of a number of different data processing parameters, such as the number of parallel processors invoked in a data processing operation or the proportion of the computational power to be dedicated to the operation in question relative to the power dedicated to concurrent data processing operations. However, in preferred embodiments, the performance controlling parameter is at least one of a processor frequency and a processor operating voltage of the data processing apparatus. This provides for appropriate selection of one of a plurality of possible power consumption levels in a system that offers a plurality of different processor performance levels. It particular, it enables the performance level to be selected according to required performance criteria and properties of the self-same data block to which the performance level will be applied.

It will be appreciated that the complexity measure could be derived entirely in dependence upon properties of the data block to which the performance controlling parameter is to be applied. However, in preferred embodiments, the complexity measure is also derived in dependence upon the results of a processing operation on one or more previous data blocks.

The complexity measure could be derived from the result of any one of a number of processing operations, for example, number of writes to memory or the number of memory accesses required to complete the processing operation. However, according to preferred embodiments the result of the processing operation is the processing time required to complete a given processing operation on a preceding data block.

Although the complexity measure could be used directly to set a value for the performance controlling parameter, it is preferred that the complexity measure is first scaled in dependence upon the result of a processing operation on a preceding data block. In particular, in preferred embodiments the complexity measure is scaled according to the processing time taken to complete a processing operation the preceding data block. This gives a reliable estimate of the actual time taken to perform a given processing task on the preceding block and this estimate can be used to derive a prediction for the time that is likely to be taken to perform a similar processing task on the current data block based on the relative values of the complexity measures for the preceding and current data blocks. The scaling may take account of any changes to the required performance level between the previous and the current block such as the required image frame rate. Use of the processing time of the preceding block to scale the complexity measure allows prevailing conditions in the data processing apparatus to be taken into account thus refining the prediction of the performance setting parameter.

Although the input data stream could comprise any type of data, such as numerical data or text-based data, preferred embodiments operate on an input data stream in which at least a proportion of the data blocks comprise image data. In particular, the at least one data block is representative of an image frame or an image field. The present invention is particularly advantageous for accurately predicting a performance setting parameter where there are sudden changes in the complexity of an image sequence between image frames, for example, wherever a scene change occurs or where there is rapid movement between one frame and the next in a temporal sequence.

It will be appreciated that the complexity measure may derived from many different properties of the at least one data block such as the volume of data or the type of data contained therein. However, in preferred embodiments, the complexity measure is derived from one or more features of an image rendering display list associated with the image field or frame. Such display lists are typically used to expedite execution of graphics plotting commands and contain information associated with the image frame which is indicative of the processing work associated with the rendering of the image frame. This information is readily accessible prior to initiation of the computationally intensive image rendering operations to which the performance setting parameter may be applied.

It will be appreciated that many different features of the image rendering display list could be used to derive the complexity measure, such as the number of graphics commands enabled (anti-alias, trilinear etc.) or the number of vertices to be plotted. However, in preferred embodiments the complexity measure is derived from a count of the number of constituent image elements in the display list for the image field/frame. This image element number count is a simple parameter to compute yet provides a reliable estimate of the processing work associated with rendering of the field/frame.

In further preferred embodiments the complexity measure is derived in dependence upon other features, which are global features associated with image quality. In particular, these global features are one or more of the screen resolution, the particular types of graphics commands that have been enabled for the field/frame and the texture formats associated with the constituent image elements.

It will be appreciated that the constituent image elements from which the complexity measure is derived could be two-dimensional image elements, but in preferred embodiments the constituent image elements are three-dimensional graphics image elements (i.e. graphics primitives) such as one or more of points, lines, triangles, triangle-strips, triangle-fans and sprites.

It will be appreciated that the performance controlling parameter could be at least one of the frequency and voltage of the processor of a CPU, a co-processor or the processor associated with a peripheral device of the data processing apparatus. However, in preferred embodiments the performance controlling parameter is at least one of the processor frequency and processor operating voltage of a graphics co-processor.

Although the display list from which the complexity measure is derived could be a display list generated by an immediate mode rendering graphics processor, in preferred embodiments the display list is associated with a deferred rendering graphics processor. Deferred rendering graphics processors typically generate display lists of the type required to derive the complexity measure during the standard sequence of graphics processing operations so this information can be readily utilised without any requirement to specifically generate a display list for the purposes of setting an appropriate value of the performance control parameter.

It will be appreciated that the performance controlling parameter could be set in dependence upon any of a number of different factors (such as the predicted processing time) in addition to the derived complexity measure. In preferred embodiments, the performance controlling parameter is set in dependence upon an estimate of the number of memory accesses that will be required for a given image field/frame based on the value of the complexity measure. The number of memory accesses gives an indirect measure of the processing speed that should be set in order to meet a desired performance target.

Although the complexity measure may be any one of a number of different data block parameters. In one preferred embodiment the performance controlling parameter relates to data processing operations to be performed on an input data steam comprising image fields/frames and the complexity measure corresponds to a number of motion vectors associated with the MPEG encoded image field/frame.

According to a second aspect the invention provides a computer program product bearing a computer program for setting a value of a performance controlling parameter of a data processing apparatus operable to perform a processing operation upon at least one data block of an input data stream comprising a plurality of data blocks, said computer program comprising:

initial processing code operable to an initial processing stage of said processing operation on said at least one data block;

complexity measure deriving code operable to derive from at least one result of said initial processing stage a complexity measure indicative of an amount of data processing required to perform at least one further processing stage of said processing operation upon said at least one data block;

performance setting code operable to set said performance controlling parameter to a predicted value in dependence upon said complexity measure; and further processing code operable to perform said at least one further processing stage upon said at least one data block subject to said predicted value of said performance controlling parameter.

According to a third aspect the invention provides a data processing apparatus operable to set a value of a performance controlling parameter of a data processing apparatus operable to perform a processing operation upon at least one data block of an input data stream comprising a plurality of data blocks, said apparatus comprising:

initial processing logic operable to an initial processing stage of said processing operation on said at least one data block;

complexity measure deriving logic operable to derive from at least one result of said initial processing stage a complexity measure indicative of an amount of data processing required to perform at least one further processing stage of said processing operation upon said at least one data block;

performance setting logic operable to set said performance controlling parameter to a predicted value in dependence upon said complexity measure; and further processing logic operable to perform said at least one further processing stage upon said at least one data block subject to said predicted value of said performance controlling parameter.

The above, and other objects, features and advantages of this invention will be apparent from the following detailed description of illustrative embodiments which is to be read in connection with the accompanying drawings.

BRIEF DESCRIPTION OF THE DRAWINGS

FIG. 4 schematically illustrates the predicted processing time associated with each of a number of display lists and the corresponding selected processing speed for processing the associated image frame.

DESCRIPTION OF THE PREFERRED EMBODIMENTS

Figure 1:
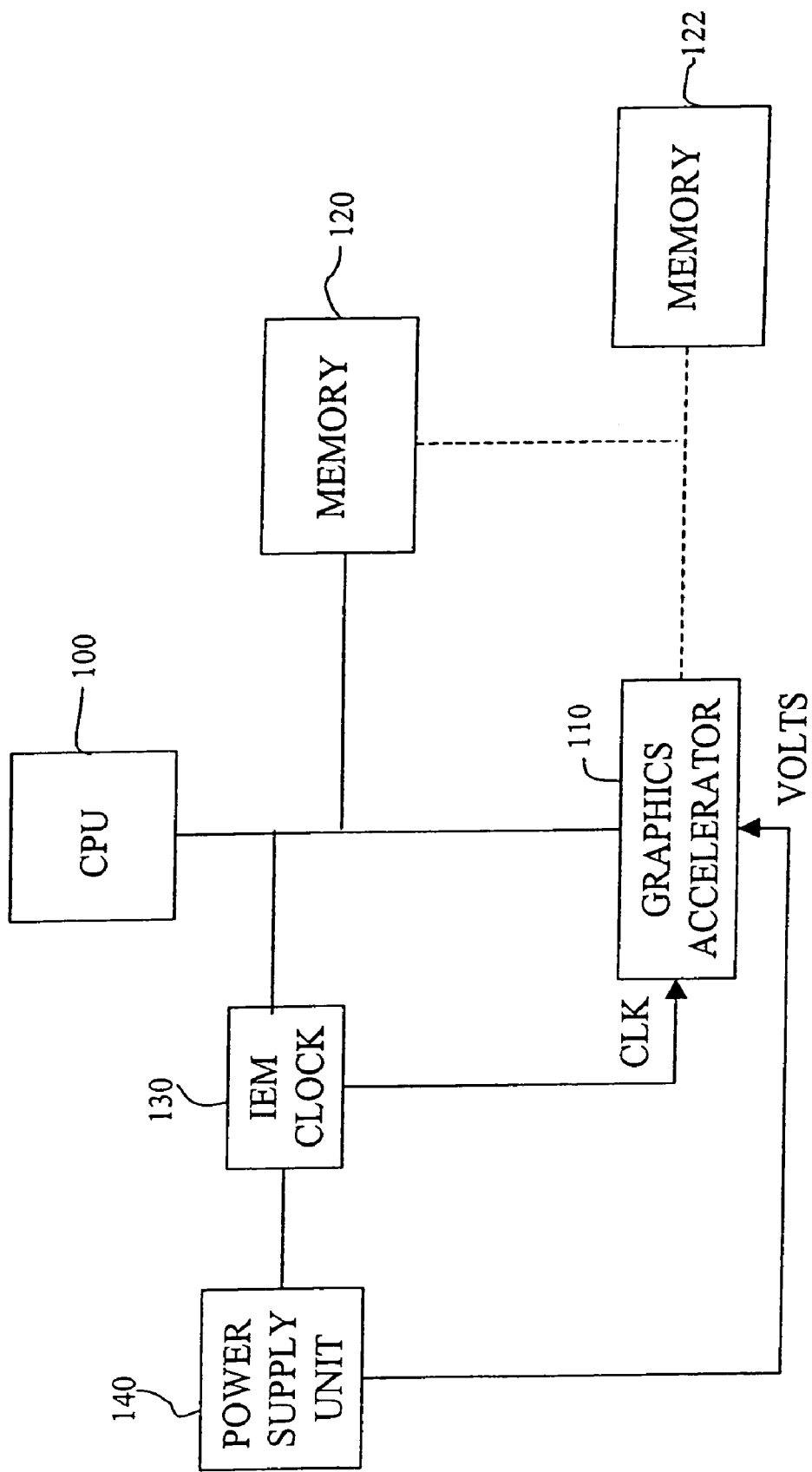
FIG. 1 schematically illustrates a graphics processing apparatus for rendering 3D graphics.

FIG. 1 schematically illustrates a graphics processing apparatus for rendering 3D graphics. The apparatus comprises: a central processing unit (CPU) 100; a graphics accelerator 110; a first memory module 120 and an optional second memory module 122; an Intelligent Energy Management (IEM) clock 130 and a power supply unit 140.

The CPU 100 controls the 3D graphics processing operations. Images are constructed from constituent image elements known as graphics primitives or polygons and a 2D to 3D texture mapping process is performed to add visual detail to the 3D geometry. Examples of types of graphics primitives are points, lines, linestrips (comprising a plurality of lines that share vertices), triangles, trianglestrips (comprising a plurality of triangles that share sides), trianglefans (comprising a plurality of triangles all of which share a common vertex) and sprites (independent rectangles defined by the vertices of diagonally opposite corners).

The CPU delegates certain image processing tasks to the graphics accelerator 110, which comprises a graphics co-processor and an application program interface (API) that enables interoperability of the graphics accelerator with different operating system platforms. In particular, the graphics accelerator is responsible for image rendering and mediates the sending of images to an associated display screen (not shown) and for refreshing those images on the display screen in response to user input. Image rendering involves the conversion of a high-level object based description into a graphical image for display. The API specifies a set of commands for directing drawing actions or for causing special effects. Examples of commands that may be requested through the API are alpha blending (i.e. transparency effects), anti-aliasing (adjusting pixel values to smooth transition between foreground line colour and background colour), texture mapping to graphics primitives and geometrical transformations. The graphics accelerator 110 accesses the first memory 120 by direct memory access but since frequent accesses to the first memory 120 may have a detrimental impact on the performance of the CPU 100 a second memory 122 may optionally be provided for use by the graphics accelerator.

There are two distinct types of graphics rendering: immediate mode rendering and deferred rendering. Immediate mode renderers process all of the graphics primitives in a scene, and apply shading and textures to determine the colour information for each pixel. A depth value (Z value) is associated with each pixel and the depth and colour information are sent down the processing pipeline. Objects are processed in the order that they are received from the pipe. For example each pixel may have 32 bits of colour/transparency information and 24 bits of depth information. The scene is drawn once the depth and colour information for each pixel has been computed. In immediate mode rendering the Z values (stored in a Z buffer) will only be used when the graphics co-processor starts to render the image, at which point it will determine whether one pixel overlaps another. Since objects are processed in the order that they are received from the pipeline, processing resources may be wasted by drawing objects that will ultimately be obscured by others. This process is known as overdraw and is very wasteful of memory bandwidth. Deferred rendering avoids overdraw. The graphics accelerator 110 of the present arrangement implements deferred rendering. Deferred rendering ensures that no pixel is drawn unnecessarily i.e. pixels that are occluded by opaque graphics primitives between that pixel and the viewer are not drawn.

In addition to controlling the graphics accelerator 110, the CPU 100 also controls the IEM clock 130. The IEM clock 130 supplies a clock signal to the graphics accelerator 110. The CPU is operable to select one of a number of predetermined clock frequencies at which to drive the graphics co-processor of the graphics accelerator 110 in dependence upon the required data processing workload. The CPU 100 also controls the power supply unit 140 such that it supplies a voltage to the voltage domain of the graphics accelerator 110 that is sufficiently high to support the selected graphics co-processor frequency.

Figure 2:
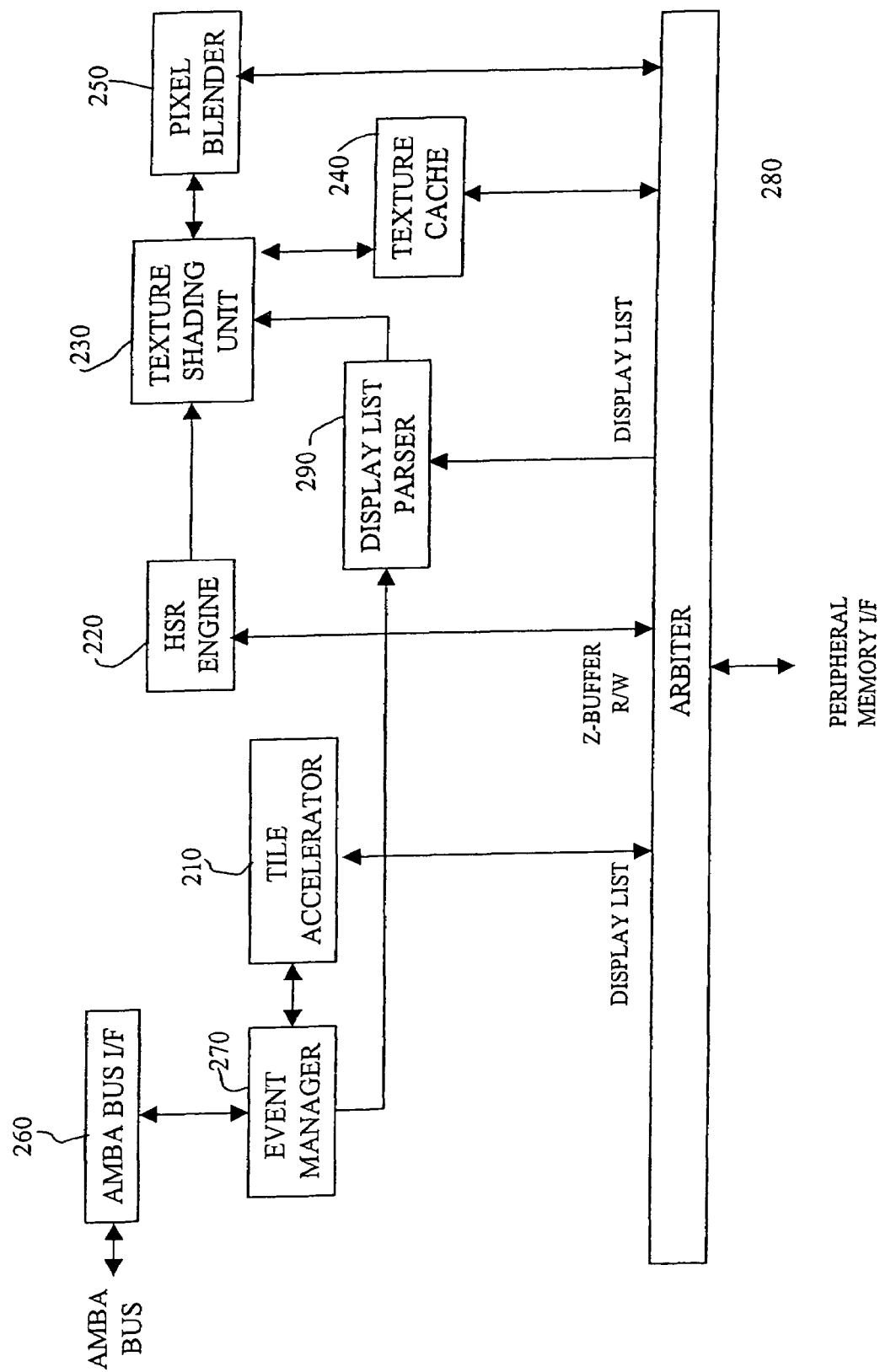
FIG. 2 schematically illustrates the internal architecture of the graphics accelerator of FIG. 1.

FIG. 2 schematically illustrates the internal architecture of the graphics accelerator 110 of FIG. 1. The graphics accelerator comprises: a tile accelerator 210; a hidden surface removal (HSR) engine 220; a texture shading unit 230; a texture cache 240; a pixel blender 250; an AMBA™ bus interface 260; an event manager 270, an arbiter 280 and a display list parser 290. The deferred rendering process of the present arrangement is a tile-based rendering process that involves segmenting the image into small sections known as tiles and processing each tile in turn. The tile accelerator 210 performs calculations associated with the constituent tiles of each image frame. The particular graphics primitives used by this arrangement are triangles. The triangle data for the entire image frame is contained in a "display list", which is accessible to the tile accelerator through the arbiter 280.

A display list is a group of graphics drawing commands that may be used repeatedly by calling the display list. On creation of a display list memory is allocated to store the drawing commands and values of any variables associated with the drawing commands. The use of a display list generally results in faster execution of the commands contained in it. However, display lists containing a very large number of commands may incur a performance penalty due to the required memory transfer operations. In the present arrangement software drivers in the graphics accelerator 110 create a display list for the scene before starting to render the scene in graphics hardware.

The tile accelerator 210 bins the triangle data (including triangles obscured by foreground objects) to determine all of the triangles located at least partially in each given tile. Each tile has an associated tile buffer that stores pointers to the triangles associated with that tile. The tile accelerator is controlled by the event manager 270, which is in turn connected to the AMBA bus interface 260. The AMBA on-chip bus interface 60 allows communication with the CPU 100. The HSR engine 220 performs hidden surface removal HSR involves analysing the triangle data and using the depth data (Z values) for each triangle to determine which triangles are at the foremost positions in the image at each pixel location. This is done by performing a comparison of Z values for each triangle to determine for each pixel, which triangle is closest to the viewer in the image scene. The HSR engine 220 can read from and write to a Z buffer containing the depth data through the arbiter 280. Note that Z buffer stores depth data for a given tile and not for the whole screen. The output of the HSR engine 220 is supplied as input to the texture shading unit 230. Accordingly, only after hidden surfaces have been removed are the remaining pixels textured and shaded. The texture shading unit 230 accesses texture data from memory 120, 122 via the texture cache 240 and the arbiter 280. The texture shading unit 230 accesses the display list through the display list parser 290. Performing texture shading subsequent to hidden surface removal reduces the required bandwidth in retrieving texture data from memory. The pixel blender 250 interfaces with the texture shading unit to perform processing tasks such as alpha-blending.

Figure 3:
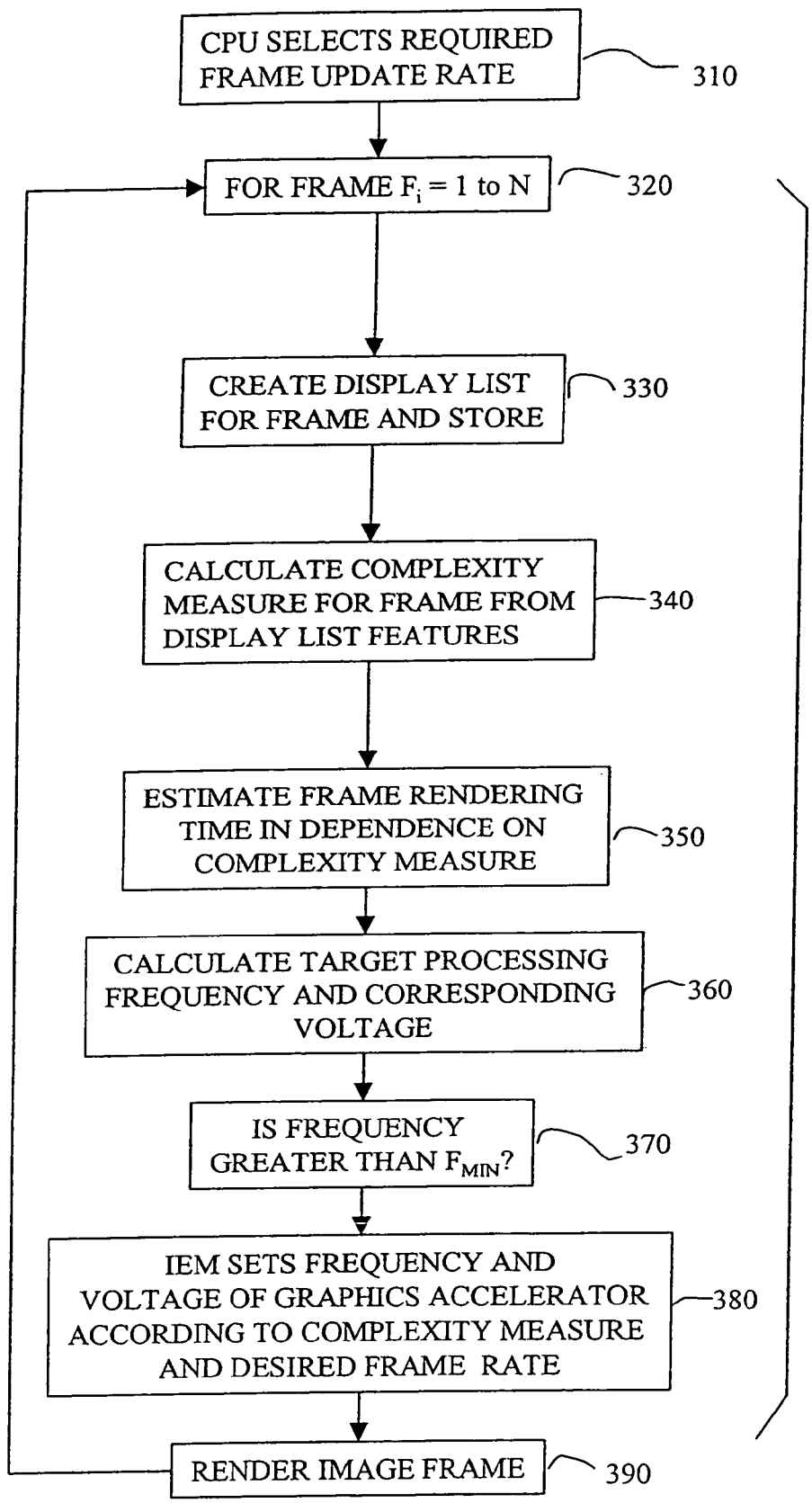
FIG. 3 is a flow chart that schematically illustrates a sequence of steps performed in setting an appropriate processor speed for a 3D graphics processing operation.

FIG. 3 is a flow chart that schematically illustrates a sequence of steps performed in setting an appropriate processor speed for a 3D graphics processing operation. The process begins at stage 310 when the CPU selects a required frame update rate for the graphics processing so that the graphics performance perceived by the user is not adversely impacted by scaling of the processor frequency. In this case a target frame rate of 30 frames per second is selected (so that on average each frame should be rendered within 30 milliseconds). Next at stage 320 the process enters a loop that is performed for each of N image frames in the image sequence. At stage 330 the CPU creates the display list for the image frame and stores it in memory 220, 222. The display list includes information on the total number of triangles in the scene, and although at the pre-rendering stage the display list does not give an indication of the size of each triangle or the overdraw factor it still provides a reliable estimate of the complexity of the associated frame. Global "switches" or quality factors such as screen resolution and graphics features such as anti-aliasing and the texture filtering mode (e.g. bilinear, trilinear or anisotropic) are known by the software drives.

At stage 340 the complexity measure for the frame is calculated in dependence upon the display list features. In this example the complexity measure is taken to be the number of triangles in the display list for the frame. In alternative arrangements the complexity measure could be calculated in dependence upon at least one of the screen resolution, the texture formats used in the frame or the graphics features enabled. From the triangle count in the display list (i.e. the complexity measure), the number of memory accesses likely to be required for the frame can be estimated and used to set an appropriate value for the graphics co-processor speed. In further alternative arrangements, the complexity measure could be derived from the display list after tiling has been performed. During the tiling process, for each tile, a list of triangles is created containing all triangles that are in the respective tile and which are potentially visible in that tile. The total count of intersecting pairs of tiles and triangles may be used as an alternative complexity measure to the triangle number count. Deriving the complexity measure after tiling in this way is more accurate than the method whereby the total number of triangles in the display list is used in the case where there is a very large triangle. In the case of a very large triangle, the triangle count estimate is likely to give a complexity measure that is too low. However, since the number of tiles intersected by a large triangle will be also be large a more accurate complexity measure is thus obtained post-tiling. In this case the clock frequency will be adjusted (in dependence upon the complexity measure) after tiling but before rendering. Tiling and rendering are roughly comparable tasks in terms of processing time so in this case the adjusted clock frequency would be implemented approximately half way through the sequence of processing operations.

Next, at stage 350, the frame rendering time is estimated in dependence upon the complexity measure. This is done by monitoring the time taken to draw all triangles of the display list corresponding to a previous frame, dividing by the number of triangles in that previous display list and scaling the time according the number of triangles in the display list of the current frame. Alternatively, a weighted average of the times taken to draw a triangle for each of the previous j frames (j=4 or 5 say) may be used to estimate the current frame rendering time.

Next, at stage 360, the target processor frequency is calculated in dependence upon the estimated frame rendering time at the currently set processor speed and the target frame rendering time. Clearly if the estimated frame rendering time exceeds 30 milliseconds then the processor speed will be increased to a predetermined level at which the target rendering time can be achieved. However, if the estimated frame rendering time is less than the target time of 30 ms at the present processor frequency then the processor frequency is reduced to the lowest of the predetermined frequency levels at which the target time can still be realistically achieved. In the present arrangement the new processor clock frequency is calculated as follows:

$$F' = \frac{T'}{T} \times \frac{C'}{C} \times F$$

where F' is the new processor frequency, F is the previous processor frequency, T' is the target frame rendering time (e.g. 30 ms), T is the measured rendering time for the previous frame, C' is the new complexity value and C is the complexity value for the previous frame. The appropriate voltage V' corresponding to the new processor frequency F' is selected from a look up table but is constrained to be sufficiently high to be able to support F'. Note that more than one previous frame can be used in the calculation of the new clock frequency, the relative contribution of those previous frames being appropriately weighted. The new processor clock frequency F' may also be calculated in dependence upon a target power consumption level appropriate for a particular data processing mode.

It will be appreciated that the target frame rendering time may not be achievable even at the highest available processor frequency. Furthermore, even if the target rendering time can be achieved at an available processor frequency, it may not be achievable within a maximum power threshold appropriate for a current operating mode of the data processor. In either of these cases inessential processing functions associated with the processing operation e.g. global quality features such as anti-aliasing, triilinear/anisotropic filtering can be automatically disabled by the system in an attempt to meet the target frame rendering time and/or stay within a power budget.

At stage 370 it is determined if F' is greater than a predetermined minimum processor frequency $F_{min}$. If F' is greater than $F_{min}$ then the process proceeds directly to stage 380, otherwise F' is increased such that it exceeds $F_{min}$ and then the process proceeds to stage 380. The $F_{min}$ frequency threshold is a precautionary measure to anticipate the scenario where the display list may comprise a small number of very large triangles. If the triangles are very large then significant processing work will be required to perform the texture mapping although the predicted processing work is based on the number but not the size of the triangles (since the size information is not available from the display list). At stage 380 the Intelligent Energy management software sets the processor frequency and voltage values of the graphics accelerator to the desired values via the clock signal from the IEM clock 130 and the voltage supplied to the graphics accelerator 110 by the power supply unit 140. Finally at stage 390 the subsequent stages (i.e. stages subsequent to creation of the display list) of processing of the image frame are performed at the newly calculated processor frequency and voltage so that the image frame is rendered.

Steps 330 through 390 are repeated for each frame in the image sequence. The system monitors the actual rendering time for each image frame and compares it with the predicted rendering time. If the discrepancy between the actual and predicted rendering time exceeds a threshold amount e.g. if a frame took twice the predicted time to render then the predictions for subsequent frames may be made by reverting to the known technique of measuring the rendering time of the previous frame and assuming that the current frame will take a similar time to render. Alternatively, in the case of a large discrepancy, the clock frequency can be automatically set to the highest available frequency.

FIG. 4 schematically illustrates the predicted processing time associated with each of a number of display lists and the corresponding selected processing speed for processing the associated image frame. This Figure shows the display lists for each of three image frames. The first display list contains instructions to draw 6 triangles; the second display list contains instructions to draw 12 triangles and the third display list contains instructions to draw 24 triangles. Beneath each display list a bar graph representing the estimated processing time needed to achieve a required frame rate is shown. The estimated processing time is determined from the estimated number of memory accesses for the frame based on the triangle count. Accordingly, the processing time for the 12 triangles of the second display list is double that for the six triangles of the first display list and the estimated processing time for the 24 triangles of the third display list is approximately four times that of the 4 triangles of the first display list for the same target frame rate. Accordingly, if the selected processor frequency for frame 1 is $F_1$ then the frequency for frame 2 will be $2*F_1$ and the frequency for frame 3 will be $4*F_1$. Although in this case, for the purposes of illustration a simple linear relationship between triangle count and estimated processing time and selected processor speed has been shown, it will be appreciated that the relationship may well be non-linear.

In the example arrangement of the 3D graphics apparatus illustrated in FIGS. 1 to 4, the triangle count corresponding to the current data block (image frame) is used as a complexity measure to predict the required processor speed for the subsequent processing operations to be performed on that same data block. The present technique may alternatively be used in other data processing systems such as those that process two-dimensional rather than three-dimensional graphics. One particular alternative arrangement relates to an MPEG (Moving Pictures Expert Group) standard encoding/decoding system.

MPEG is a compression standard that utilises redundancy both within an image (intra-frame redundancy) and between images (inter-frame/temporal redundancy). The MPEG image stream typically comprises I frames, which are compressed without reference to other frames, P frames that are predicted by referring back to an earlier frame and B frames that are predicted by referring to both the preceding and succeeding frame. A technique known as motion prediction is used to improve compression ratios achievable for P or B frames in the case of object movement within a scene or in the case of pan shots. During the MPEG encoding process each image field/frame is divided into discrete image blocks and a Discrete Cosine Transform (DCT) is performed on each image block to transform the information from the spatial to the frequency domain. For a P frame for example, the DCT block to be compressed will be the difference between two matching blocks in two image frames. If an object has moved between the two image frames then the quality of the prediction can be improved by generating the difference frame not from a comparison of the same spatial area of the two frames but from different areas of the two frames. A motion prediction module of the MPEG encoder takes each block of a first frame and searches block by block to find the best matching block in a second frame (e.g. the preceding frame). The difference block is then generated from the offset position resulting in a more highly compressible DCT block. The compressed DCT block is transmitted together with "motion vectors" that indicate the area of the reference image that was used for comparison. According to the present technique, the number of motion vectors in the field/frame may be used as a complexity measure in the MPEG decoder to estimate the required processor speed to achieve the required target frame rate.

Although in the above described arrangements the complexity measure is derived using computer software, in alternative arrangements the complexity measure could be derived, at least in part from hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of setting a value of a performance controlling parameter of a data processing apparatus operable to perform a processing operation upon at least one data block of an input data stream comprising a plurality of data blocks, said method comprising:

performing an initial processing stage of said processing operation on said at least one data block;

deriving from at least one result of said initial processing stage a complexity measure indicative of an amount of data processing required to perform at least one further processing stage of said processing operation upon said at least one data block;

setting said performance controlling parameter to a predicted value in dependence upon said complexity measure; and performing said at least one further processing stage upon said at least one data block subject to said predicted value of said performance controlling parameter, wherein at least one of said plurality of data blocks of said input data stream comprises one of an image field or an image frame, and said complexity measure is derived from one or more features of an image rendering display list generated by a deferred rendering graphics processor, for said one of an image field or an image frame, and wherein said one or more features used to derive said complexity measure comprises a count of constituent image items in said image rendering display list.

2. A method as claimed in claim 1, wherein said performance controlling parameter is at least one of a processor frequency and a processor operating voltage of said data processing apparatus.

3. A method as claimed in claim 1, wherein said complexity measure is also derived in dependence upon a result of a processing operation performed on at least one preceding data block of said input data stream.

4. A method as claimed in claim 3, wherein said result of said processing operation on said preceding data block is a processing time.

5. A method as claimed in claim 4, wherein said complexity measure is scaled in dependence upon said result of said processing operation on said preceding data block to derive a value for said performance controlling parameter.

6. A method as claimed in claim 1, wherein said constituent image items are three dimensional graphics image elements.

7. A method as claimed in claim 1, wherein said performance controlling parameter is at least one of a processor frequency and a processor operating voltage of a graphics co-processor.

8. A method according to claim 1, wherein said one or more features used to derive said complexity measure include texture formats associated with said constituent image elements.

9. A method according to claim 1, wherein said one or more features used to derive said complexity measure comprises a screen resolution associated with said one of an image field or an image frame.

10. A method according to claim 1, wherein said complexity measure is calculated in dependence upon those ones of a group of graphics processing features that are enabled for said image field or frame.

11. A method according to claim 1, wherein said performance controlling parameter is set by estimating a number of memory accesses per said one of an image field or an image frame in view of said derived complexity measure.

12. A method as claimed in claim 1, wherein said one of an image field and an image frame is MPEG encoded and said complexity measure is a number of motion vectors required to decode said one of an image field or an image frame.

13. A method as claimed in claim 1, wherein said predicted value of said performance controlling parameter is selected from a predetermined range of parameter values.

14. A method as claimed in claim 13, wherein said predicted value of said performance controlling parameter is set in dependence upon at least one of a target processing time and a target power consumption level.

15. A method as claimed in claim 14, wherein when at least one of said target processing time and said target power consumption level cannot be met by setting said predicted value to be in said predetermined range, one or more inessential processing functions associated with said processing operation are disabled.

16. A computer program product comprising a computer readable storage medium containing computer readable instructions for setting a value of a performance controlling parameter of a data processing apparatus operable to perform a processing operation upon at least one data block of an input data stream comprising a plurality of data blocks, said computer program comprising:

initial processing code operable to an initial processing stage of said processing operation on said at least one data block;

complexity measure deriving code operable to derive from at least one result of said initial processing stage a complexity measure indicative of an amount of data processing required to perform at least one further processing stage of said processing operation upon said at least one data block;

performance setting code operable to set said performance controlling parameter to a predicted value in dependence upon said complexity measure; and further processing code operable to perform said at least one further processing stage upon said at least one data block subject to said predicted value of said performance controlling parameter, wherein at least one of said plurality of data blocks of said input data stream comprises one of an image field or an image frame, and said complexity measure deriving code is operable to derive said complexity measure from one or more features of an image rendering display list generated by a deferred rendering graphics processor, for said one of an image field or an image frame, and wherein said one or more features used by said complexity measure deriving code to derive said complexity measure comprises a count of constituent image items in said image rendering display list.

17. A computer program product as claimed in claim 16, wherein said performance controlling parameter set by said performance setting code is at least one of a processor frequency and a processor operating voltage of said data processing apparatus.

18. A computer program product as claimed in claim 16, wherein said complexity measure deriving code is operable to derive said complexity in dependence upon a result of a processing operation performed on at least one preceding data block of said input data stream.

19. A computer program product as claimed in claim 18, wherein said result of said processing operation on said preceding data block used by said complexity measure deriving code to derive said complexity measure is a processing time.

20. A computer program product as claimed in claim 19, wherein said complexity measure deriving code is operable to scale said complexity measure in dependence upon said result of said processing operation on said preceding data block to derive a value for said performance controlling parameter.

21. A computer program product as claimed in claim 16, wherein said constituent image items are three dimensional graphics image elements.

22. A computer program product as claimed in claim 16, wherein said performance controlling parameter set by said performance setting code is at least one of a processor frequency and a processor operating voltage of a graphics co-processor.

23. A computer program product as claimed in claim 16, wherein said one or more features used to derive said complexity measure include texture formats associated with said constituent image elements.

24. A computer program product as claimed in claim 16, wherein said one or more features used by said complexity measure deriving code to derive said complexity measure comprises a screen resolution associated with said one of an image field or an image frame.

25. A computer program product as claimed in claim 16, wherein complexity measure is calculated in dependence upon those ones of a group of graphics processing features that are enabled for said image field or frame.

26. A computer program product as claimed in claim 16, wherein said performance setting code is operable to set said performance controlling parameter by estimating a number of memory accesses per said one of an image field or an image frame in view of said derived complexity measure.

27. A computer program product as claimed in claim 16, wherein said one of an image field and an image frame is MPEG encoded and said complexity measure is a number of motion vectors required to decode said one of an image field or an image frame.

28. A computer program product as claimed in claims 16, wherein said performance setting code is operable to select said predicted value is selected from a predetermined range of parameter values.

29. A computer program product as claimed in claim 28, wherein said predicted value is set in dependence upon at least one of a target processing time and a target power consumption level.

30. A computer program product as claimed in claim 29, wherein when at least one of said target processing time and said target power consumption level cannot be met by setting said predicted value to be in said predetermined range, one or more inessential processing functions associated with said processing operation are disabled.

31. A data processing apparatus operable to set a value of a performance controlling parameter of a data processing apparatus operable to perform a processing operation upon at least one data block of an input data stream comprising a plurality of data blocks, said apparatus comprising:

initial processing logic operable to an initial processing stage of said processing operation on said at least one data block;

complexity measure deriving logic operable to derive from at least one result of said initial processing stage a complexity measure indicative of an amount of data processing required to perform at least one further processing stage of said processing operation upon said at least one data block;

performance setting logic operable to set said performance controlling parameter to a predicted value in dependence upon said complexity measure; and further processing logic operable to perform said at least one further processing stage upon said at least one data block subject to said predicted value of said performance controlling parameter, wherein at least one of said plurality of data blocks of said input data stream comprises one of an image field or an image frame, and said complexity measure deriving logic is operable to derive said complexity measure from one or more features of an image rendering display list generated by a deferred rendering graphics processor, for said one of an image field or an image frame, and wherein said one or more features used by said complexity measure deriving logic to derive said complexity measure comprises a count of constituent image items in said image rendering display list.

32. A data processing apparatus as claimed in claim 31, wherein said performance controlling parameter set by said performance setting logic is at least one of a processor frequency and a processor operating voltage of said data processing apparatus.

33. A data processing apparatus as claimed in claim 31, wherein said complexity measure deriving logic is operable to derive said complexity in dependence upon a result of a processing operation performed on at least one preceding data block of said input data stream.

34. A data processing apparatus as claimed in claim 33, wherein said result of said processing operation on said preceding data block used by said complexity measure deriving logic to derive said complexity measure is a processing time.

35. A data processing apparatus as claimed in claim 34, wherein said complexity measure deriving logic is operable to scale said complexity measure in dependence upon said result of said processing operation on said preceding data block to derive a value for said performance controlling parameter.

36. A data processing apparatus as claimed in claim 31, wherein said constituent image items are three dimensional graphics image elements.

37. A data processing apparatus as claimed in claim 31, wherein said performance controlling parameter set by said performance setting logic is at least one of a processor frequency and a processor operating voltage of a graphics co-processor.

38. A data processing apparatus as claimed in claim 31, wherein said one or more features used to derive said complexity measure include texture formats associated with said constituent image elements.

39. A data processing apparatus as claimed in claim 31, wherein said one or more features used by said complexity measure deriving logic to derive said complexity measure comprises a screen resolution associated with said one of an image field or an image frame.

40. A data processing apparatus as claimed in claim 31, wherein said complexity measure is calculated in dependence upon those ones of a group of graphics processing features that are enabled for said image field or frame.

41. A data processing apparatus as claimed in claim 31, wherein said performance setting logicis operable to set said performance controlling parameter by estimating a number of memory accesses per said one of an image field or an image frame in view of said derived complexity measure.

42. A data processing apparatus as claimed in claim 31, wherein said one of an image field and an image frame is MPEG encoded and said complexity measure is a number of motion vectors required to decode said one of an image field or an image frame.

43. A data processing apparatus as claimed in claim 31, wherein said performance setting logic is operable to select said predicted value of said performance controlling parameter from a predetermined range of parameter values.

44. A data processing apparatus as claimed in claim 43, wherein said predicted value is set in dependence upon at least one of a target processing time and a target power consumption level.

45. A data processing apparatus as claimed in claim 44, wherein when at least one of said target processing time and said target power consumption level cannot be met by setting said predicted value to be in said predetermined range, one or more inessential processing functions associated with said processing operation are disabled.

* * * * *